US011860579B2

(12) United States Patent
Allimann et al.

(10) Patent No.: US 11,860,579 B2
(45) Date of Patent: Jan. 2, 2024

(54) DEVICE FOR FASTENING A BACK ON A MIDDLE FOR A TIMEPIECE

(71) Applicant: The Swatch Group Research and Development Ltd, Marin (CH)

(72) Inventors: Joël Allimann, Vallon (CH); Jean-Claude Martin, Montmollin (CH); Simon Garcin, Salavaux (CH)

(73) Assignee: The Swatch Group Research and Development Ltd, Marin (CH)

( * ) Notice: Subject to any disclaimer, the term of this patent is extended or adjusted under 35 U.S.C. 154(b) by 226 days.

(21) Appl. No.: 17/375,420

(22) Filed: Jul. 14, 2021

(65) Prior Publication Data

US 2022/0050423 A1 Feb. 17, 2022

(30) Foreign Application Priority Data

Aug. 17, 2020 (EP) .................................... 20191393

(51) Int. Cl.
*G04B 37/11* (2006.01)
*G04B 37/00* (2006.01)

(52) U.S. Cl.
CPC ........ *G04B 37/113* (2013.01); *G04B 37/0008* (2013.01); *G04B 37/11* (2013.01)

(58) Field of Classification Search
CPC .. G04B 37/113; G04B 37/11; G04B 37/0008; G04B 37/08; G04B 37/02; G04B 37/0033; G04B 37/0041; G04B 37/005
See application file for complete search history.

(56) References Cited

U.S. PATENT DOCUMENTS

| | | | | | |
|---|---|---|---|---|---|
| 4,548,514 | A * | 10/1985 | Ganter | G04B 37/081 | 368/308 |
| 4,626,108 | A * | 12/1986 | Ganter | G04B 37/081 | 368/300 |
| 5,383,166 | A * | 1/1995 | Gallay | G04B 37/103 | 368/288 |
| 2003/0016591 | A1 * | 1/2003 | Meyrat | G04B 37/0033 | 368/309 |

(Continued)

FOREIGN PATENT DOCUMENTS

| | | |
|---|---|---|
| CN | 104698810 A | 6/2015 |
| CN | 205384448 U | 7/2016 |

(Continued)

OTHER PUBLICATIONS

Machine translation of Oshio (JP H11109053) (Year: 2023).*

(Continued)

*Primary Examiner* — Edwin A. Leon
*Assistant Examiner* — Sean R Brannon
(74) *Attorney, Agent, or Firm* — Oblon, McClelland, Maier & Neustadt, L.L.P.

(57) ABSTRACT

A device is for fastening a back on a middle of a watch. The back includes a cover arranged to form a bearing surface with the middle and a body arranged to rest in the middle. The device includes a ring disposed between the back and the middle, the ring being arranged to ensure the water resistance and indexing of the back. The ring includes an upper part ensuring the water resistance and a median part including positioning to ensure precise placement of the back.

8 Claims, 2 Drawing Sheets

(56) References Cited

U.S. PATENT DOCUMENTS

| | | | | |
|---|---|---|---|---|
| 2005/0219955 | A1* | 10/2005 | Xu | G04R 60/02 368/88 |
| 2008/0043577 | A1* | 2/2008 | Mavilla | G04B 37/0008 368/310 |
| 2008/0225650 | A1* | 9/2008 | Muller | G04B 37/00 368/310 |
| 2018/0032033 | A1* | 2/2018 | Mollier | G04B 37/0463 |
| 2018/0032034 | A1* | 2/2018 | Vuille | G04B 47/04 |

FOREIGN PATENT DOCUMENTS

| | | | | |
|---|---|---|---|---|
| CN | 107656433 | A | 2/2018 | |
| CN | 208125783 | U | 11/2018 | |
| CN | 111348861 | A | 6/2020 | |
| JP | 54-160175 | U | 11/1979 | |
| JP | 11-109053 | A | 4/1999 | |
| JP | H11109053 | * | 4/1999 | G04B 37/08 |
| JP | 2001-99956 | A | 4/2001 | |
| JP | 2018-17725 | A | 2/2018 | |
| JP | 2018-17731 | A | 2/2018 | |
| TW | 200817853 | | 4/2008 | |

OTHER PUBLICATIONS

Japanese Office Action dated Jul. 12, 2022 in Japanese Patent Application No. 2021-118411 (with English translation), 8 pages.

Combined Chinese Office Action and Search Report dated Oct. 26, 2022 in Chinese Patent Application No. 202110944071.7 (with Translation of Category of Cited Documents), 10 pages.

European Search Report dated Jan. 22, 2021 in European Application 20191393.6, filed on Aug. 17, 2020 (with English Translation of Categories of cited documents), 3 pages.

* cited by examiner

DEVICE FOR FASTENING A BACK ON A MIDDLE FOR A TIMEPIECE

CROSS-REFERENCE TO RELATED APPLICATION

The present application claims priority to European Patent Application No. 20191393.6, filed Aug. 17, 2020. The benefit of priority is claimed to the foregoing, and the entire contents and disclosure of the foregoing are incorporated herein by reference.

FIELD OF THE INVENTION

The invention relates to a device for fastening a back on a middle of a watch.

The invention also relates to a timepiece, in particular a watch, including such a device.

BACKGROUND OF THE INVENTION

The external parts of watches and similar apparatuses obey many constraints, in particular water resistance, robustness, appearance, and must be produced in such a way as to prevent any involuntary dismounting resulting irreparably in an after-sales intervention for exchange of seals, cleaning, lubrication, even repair.

Some external or control components must, again, be angularly indexed relative to each other, for markings of the original, rest or actuation reference position, or to facilitate the reading of indications or graduations, or to ensure the continuity of left and/or decoration surfaces. This angular indexing is often difficult to achieve properly, in combination with a good tightening of the components and with a perfect water resistance of the seals.

Use of an elastic closing element, independent of the members to be assembled, is known as in document CH 423 637 or in patent CH 447 046. The drawback of the elastic elements proposed in these documents lies essentially in their space requirement. It is also known from document CH 512 769 to use pads made of compressible materials surrounded by crown segments which cooperate with millings made at the corners of a square or rectangular case. Such a device can only be used on cases of shape and elasticity given by a compressible material of elastomer type which is liable to change significantly during the ageing of the material.

SUMMARY OF THE INVENTION

The invention proposes to achieve a water resistant and secure assembly of external components with easy-to-adjust angular indexing.

To this end, the invention relates to a device for fastening a back on a middle according to claim 1.

The invention also relates to a timepiece including such a fastening device.

BRIEF DESCRIPTION OF THE DRAWINGS

Other features and advantages of the invention will emerge more clearly upon reading the following description of a particular embodiment of the invention, given by way of simple illustrative and non-limiting example, and the appended figures, among which.

DETAILED DESCRIPTION OF THE PREFERRED EMBODIMENTS

Figure 1A:
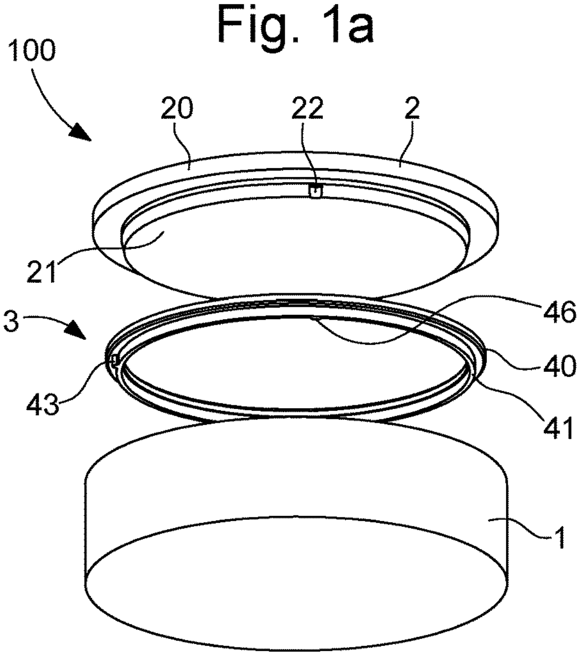
FIGS. 1*a* and 1*b* are exploded perspective views of a fastening device according to a first embodiment in accordance with the invention.

The invention proposes to achieve a water resistant and secure assembly of external components with angular indexing which is easy to be adjusted, and in a guaranteed position, with a minimum number of components, and reduced manufacturing costs.

FIGS. 1 to 5 illustrate the non-limiting example of the mounting and angular indexing of a back relative to a middle of a watch.

The invention relates to a device 100 for fastening a back 2 on a middle 1 of a watch, the back 2 comprising a cover 20 arranged to form a bearing surface with the middle 1 and a body 21 arranged to rest in the middle, said device comprising a ring 4 disposed between the back 2 and the middle 1, said ring 4 being arranged to ensure the water resistance and indexing of the back. The ring 4 comprises an upper part 40 ensuring the water resistance and a median part 41 comprising positioning means 3 to ensure the indexing of the back 2 relative to the middle 1.

Figure 1B:
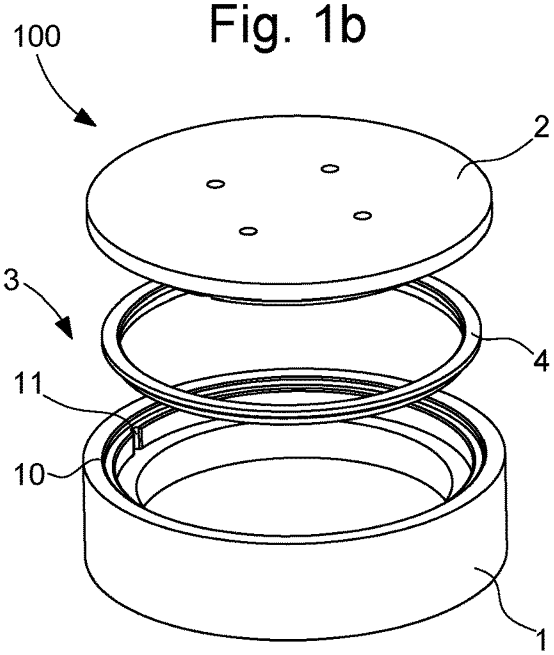
Figure 2A:
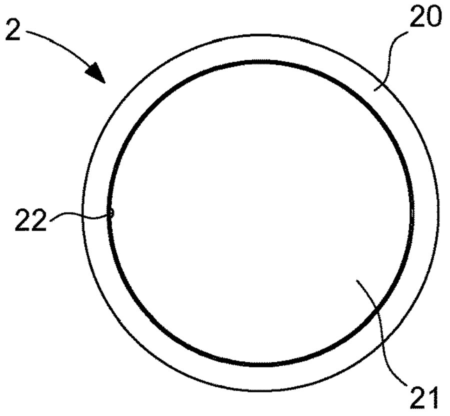
FIGS. 2*a* and 2*b* are respectively back and top views of a back and a ring of a fastening device according to a first embodiment in accordance with the invention.
Figure 2B:
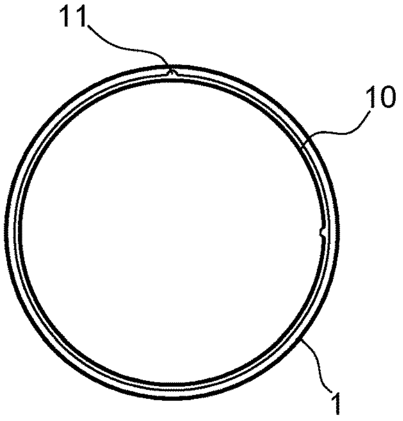

As can be seen in FIG. 1*b*, the middle 1 has a shoulder 10 on which the upper part 40 of the ring 4 rests, the ring 4 being flush with the middle once in place.

Advantageously, the positioning means 3 comprise at least one lug 43 formed on the median part 41 of the ring 4 and arranged to rest in a housing 11 of the middle 1, the lug 43 being formed on the external wall and extending over all or part of the height of the median part 41 of the ring 4. Thus, the ring 4 cannot be moved in rotation when a torque is imparted to the back, for example.

The ring 4 also comprises a lug 46 arranged to cooperate with a machining 22 formed in the back 2. Such an arrangement allows the correct positioning, or the correct indexing, of the back 2 relative to the middle 1, which is particularly useful when the back 2 has a decoration and that it must be perfectly aligned along the 12 h-6 h axis of the watch According to a variant of the invention illustrated in FIGS. 4 and 5, the ring 4 has a lower part 42, the lower part 42 having retaining means arranged to cooperate with the back 2, the retaining means being in the shape of a projecting clip 420 arranged to be housed in a slot or a housing formed in the body 21 of the back 2.

With this in mind, the ring 4 is made of a polymer material such as ASUTANE® or HYTREL®. Obviously, any other material accepting to be elastically deformed, and sufficiently strong, can be used to produce the ring 4. The external 44 and internal 45 ribs thus allow to obtain good resistance to driving out once the back 2 has been mounted, force-fitted or driven, on the middle 1.

According to a preferred embodiment of the invention, the ring 4 comprises at least two internal ribs 45 and at least two external ribs 44, the ribs being angularly spaced from each other by 60° to 90°. The internal ribs 45 and the external ribs 44 are intended to be offset relative to each other, that is to say that an external rib will not be positioned facing an internal rib, and thus provide better retention.

The back 2 and the ring 4 are dimensioned such that, when they are forced into the middle 1, the back 2 radially presses the ring 4 against said middle 28, which has the effect of compressing said elastic element 4 between the wall of the middle and the back. The ring 4 includes in particular ribs which extend over all or part of its height and which, in reaction to the compressive force, will deform and guarantee good retention of the assembly. A compression ratio of the ring 4 of the order of 20% is preferred to provide good retention. Such a ratio causes an increase in the frictional forces between the back 2 and the ring 4 on the one hand, and between the ring 4 and the middle 1 on the other hand, and therefore determines the torques involved for placing the back 2 on the watch.

Figure 3:
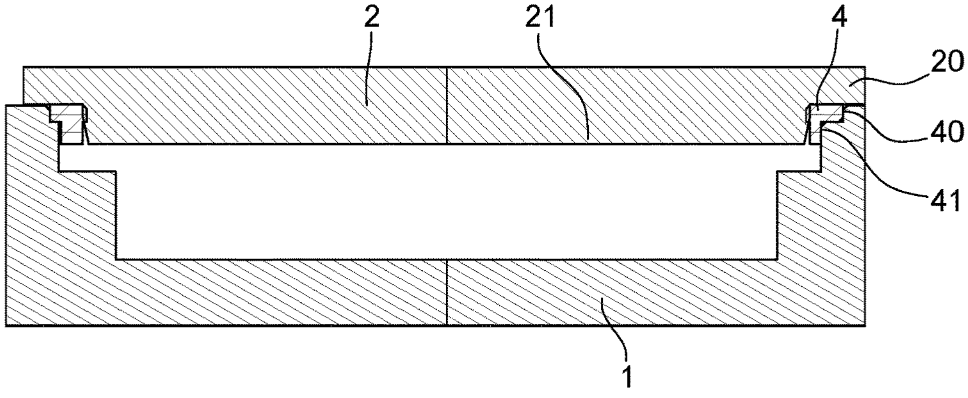
FIG. 3 is a sectional view of a fastening device according to a first embodiment in accordance with the invention.
Figure 4:
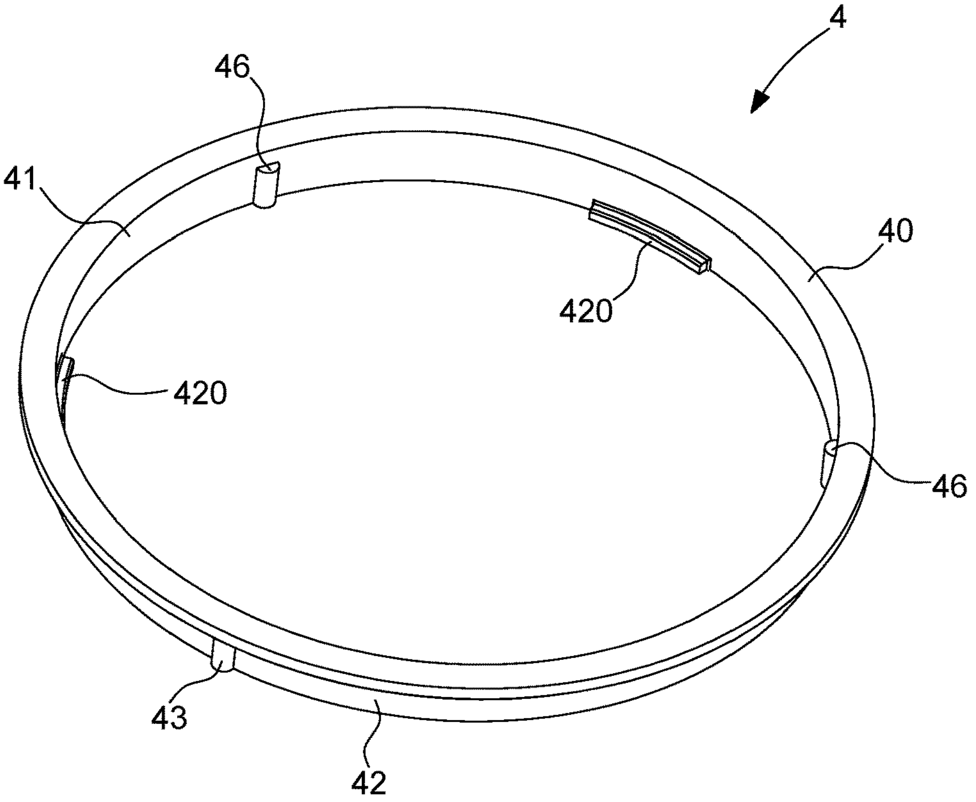
FIG. 4 is a perspective view of a ring of a fastening device according to a second embodiment in accordance with the invention.
Figure 5:
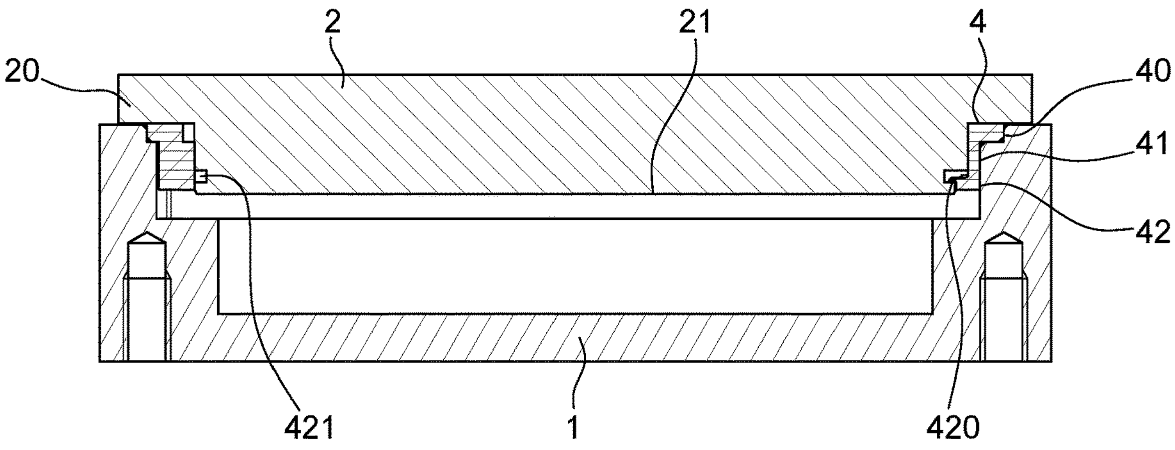
FIG. 5 is a sectional view of a fastening device according to a second embodiment in accordance with the invention.

FIG. 3 illustrates a sectional view of the back 2 and of the ring 4 assembled on the middle 1, the ring 4 being compressed between the internal side face of the middle 1 and the back 2. Forcefully positioning the back into the middle keeps the ring 4 deformed, and more particularly the external slots. This deformation is obviously within the elastic deformation limit of the material of the ring.

The invention also relates to a timepiece or watch 1000 including such a fastening device 100.

In short, the invention provides a fastening device whose design is compact, maintains the water resistance of the watch, and protects against accidental dismounting.

The invention also allows to ensure the perfect orientation of a component kept blocked in its service position.

The invention claimed is:

1. A device for fastening a back on a middle of a watch, the back comprising a cover arranged to form a bearing surface with the middle and a body arranged to rest in the middle, said device comprising:

a ring disposed between the back and the middle, said ring being arranged to ensure water resistance and indexing of the back, wherein the ring comprises an upper part ensuring the water resistance and a median part comprising positioning means to ensure a precise and indexed placement of the back, wherein the ring has a lower part, said lower part including at least one clip formed on an internal wall of the lower part to cooperate with a slot formed in the body of the back and at least one internal lug formed on the internal wall of the lower part to cooperate with a machining formed in the back, a height of the lug being greater than a height of the clip.

2. The device for fastening the back on the middle of the watch according to claim 1, wherein said positioning means comprise at least one external lug formed on an external face of the lower part of the ring to rest in a housing of the middle.

3. The device for fastening the back on the middle of the watch according to claim 1, wherein the ring is made of a polymer material.

4. The device for fastening the back on the middle of the watch according to claim 1, wherein the ring comprises on the internal wall at least two of the internal lugs extending over all or part of the height of the median part.

5. The device for fastening the back on the middle of the watch according to claim 1, wherein the ring comprises on an the external wall at least two external lugs extending over all or part of the height of the median part.

6. The device for fastening the back on the middle of the watch according to claim 1, wherein the ring comprises three of the internal lugs and three external lugs, the three internal lugs and the three external lugs being angularly spaced from each other by 60°.

7. A timepiece comprising the device for fastening the back on the middle of the watch according to claim 1.

8. The device for fastening the back on the middle of the watch according to claim 1, wherein the clip extends further around a circumference of the internal wall than the lug.

* * * * *